(12) United States Patent
Danielsson et al.

(10) Patent No.: US 12,597,252 B2
(45) Date of Patent: Apr. 7, 2026

(54) METHOD OF TRACKING OBJECTS

(71) Applicant: Axis AB, Lund (SE)

(72) Inventors: Niclas Danielsson, Lund (SE); Christian Colliander, Lund (SE); Amanda Nilsson, Lund (SE); Sarah Laross, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/962,814

(22) Filed: Nov. 27, 2024

(65) Prior Publication Data

US 2025/0174022 A1 May 29, 2025

(30) Foreign Application Priority Data

Nov. 29, 2023 (EP) ...................................... 23212951

(51) Int. Cl.
| | |
|---|---|
| *G06V 20/40* | (2022.01) |
| *G06T 7/246* | (2017.01) |
| *G06T 7/73* | (2017.01) |
| *G06V 10/75* | (2022.01) |

(52) U.S. Cl.
CPC .............. *G06V 20/48* (2022.01); *G06T 7/248* (2017.01); *G06T 7/74* (2017.01); *G06V 10/751* (2022.01); *G06T 2207/10016* (2013.01); *G06T 2207/20076* (2013.01)

(58) Field of Classification Search
CPC ...... G06V 20/48; G06V 10/751; G06V 20/54; G06V 10/761; G06V 20/40; G06T 7/248; G06T 7/74; G06T 2207/10016; G06T 2207/20076; G06T 7/246; G06T 7/73; G06T 7/90; G06T 7/70
See application file for complete search history.

(56) References Cited

U.S. PATENT DOCUMENTS

| | | | |
|---|---|---|---|
| 9,607,214 B2 | 3/2017 | Nerayoff et al. | |
| 2008/0226127 A1* | 9/2008 | Brodsky ................ | G06V 10/24 |
| | | | 382/103 |
| 2012/0105615 A1* | 5/2012 | Davidich ............... | G06V 20/53 |
| | | | 348/E7.085 |
| 2016/0004924 A1 | 1/2016 | Gao et al. | |
| 2016/0203615 A1* | 7/2016 | Saptharishi .............. | H04N 7/18 |
| | | | 382/103 |
| 2017/0243360 A1 | 8/2017 | Schulte | |
| 2022/0292286 A1* | 9/2022 | Subramanian .......... | G06T 7/277 |

FOREIGN PATENT DOCUMENTS

EP 2447882 A1 5/2012

* cited by examiner

*Primary Examiner* — Amara Abdi

(74) *Attorney, Agent, or Firm* — Volpe Koenig

(57) ABSTRACT

A computer-implemented method of tracking objects in a video sequence of a scene comprises determining a location of a sink in the scene where objects exit the scene and a location of a source where objects enter the scene; tracking a first object moving in the scene using a re-identification algorithm, wherein the first object is associated with a re-identification threshold of the re-identification algorithm; detecting that the first object has exited the scene at the sink; and responsive to detecting that the first object has exited the scene at the sink, adjusting the re-identification threshold associated with the first object such that a probability that the re-identification algorithm re-identifies a second object, entering the scene at the source after the first object has exited the scene at the sink, as the first object is reduced.

11 Claims, 4 Drawing Sheets

1

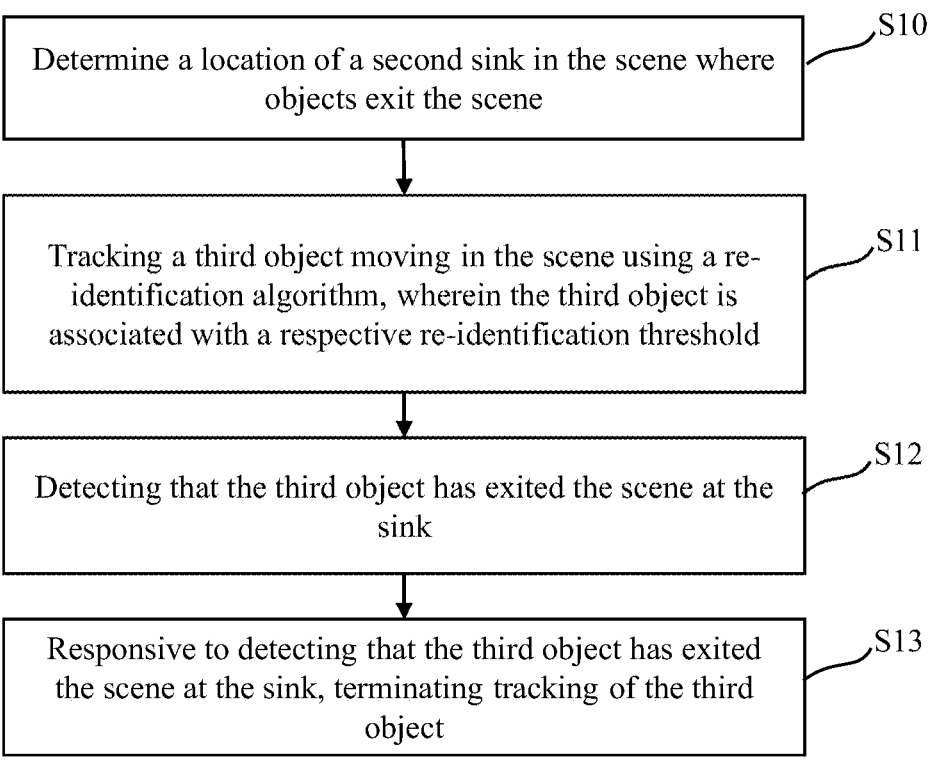

Determine a location of a second sink in the scene where objects exit the scene ⟋S10

Tracking a third object moving in the scene using a re-identification algorithm, wherein the third object is associated with a respective re-identification threshold ⟋S11

Detecting that the third object has exited the scene at the sink ⟋S12

Responsive to detecting that the third object has exited the scene at the sink, terminating tracking of the third object ⟋S13

*Fig. 4*

METHOD OF TRACKING OBJECTS

TECHNICAL FIELD

The present invention generally relates to a computer-implemented method of tracking objects in a video sequence of a scene.

BACKGROUND

A common application for video surveillance systems is tracking of objects moving about in a monitored scene. A computer vision-based technique for object tracking is re-identification ("ReID") wherein an object of interest (e.g. a person, a vehicle, an animal) is identified in one frame and then re-identified in successive frames. The track of the object (e.g. the coordinates of the object in the frames) may be recorded in a "tracklet" maintained for the object.

Re-identification has a wide range of applications, including surveillance, traffic monitoring, and crowd analysis. More generally, re-identification may be useful in situations where an object being tracked may be temporarily occluded during the tracking. If the object following an occlusion (partial or complete) can be re-identified as being the same object as prior to the occlusion, the re-identified object (and its track) can following the occlusion be associated with the object and track identified before the occlusion. A corresponding approach may be used when tracking an object moving from a first camera view of a scene to a second camera view of the scene.

SUMMARY

It has been realized by the inventors that in tracking scenarios involving tracking of objects with similar appearance (e.g., vehicles of similar make, model and/or color or people with similar clothes and/or appearance) the use of re-identification, as conventionally implemented, introduces a risk of inadvertently identifying similar but different objects (e.g., different cars of a same model and similar color) as a same object when one of the similar objects has left the scene at a sink and a similar but different object thereafter appears at a source. It is an object of the present invention to provide a method for tracking objects using re-identification which mitigates this risk.

Hence, according to a first aspect of the present invention, there is provided a computer-implemented method of tracking objects in a video sequence of a scene, the method comprising:

determining a location of a sink in the scene where objects exit the scene and a location of a source where objects enter the scene;

tracking a first object moving in the scene using a re-identification algorithm, wherein the first object is associated with a re-identification threshold of the re-identification algorithm;

detecting that the first object has exited the scene at the sink; and responsive to detecting that the first object has exited the scene at the sink, adjusting the re-identification threshold associated with the first object such that a probability that the re-identification algorithm re-identifies a second object, entering the scene at the source after the first object has exited the scene at the sink, as the first object is reduced.

By adjusting the re-identification threshold, a greater similarity between the second object and the first object is needed for the re-identification algorithm to re-identify the second object as the first object. Thereby, the method enables a reduced risk of inadvertently re-identifying an object, entering the scene at the source, and which is visually similar to a tracked object having previously exited the scene at the sink, but corresponds to a different physical object than the tracked object, as the tracked object.

In a case of temporary occlusion of an object moving across the scene, similar objects detected in the video sequence before and after the occlusion likely correspond to the same physical object. Re-identification is in this case hence proper and desired. However, the likelihood that a physical object exits the scene at a sink only to re-enter the scene again shortly thereafter is typically lower. However, some scenes include a source and a sink with relative locations such that re-entry at the source of a physical object some time after the same physical object has exited the scene at the sink is still a possibility. Thus, a simplistic approach of directly terminating tracking of an object upon detecting exit of the tracked object at the sink would not allow properly handling such an exit-and-re-entry scenario. That is, identifying the re-entering object as a new object could result in loss of potentially relevant tracking information. In contrast, by adjusting the re-identification threshold associated with the first object, rather than directly terminating tracking of the exiting object, the inventive method allows a correct re-identification of a re-entering object at a source, the re-entering object having previously exited the scene at a sink.

Thus the method enables object tracking with improved reliability, in particular in tracking scenarios likely to include visually similar objects. The improved reliability is furthermore provided without sacrificing the benefits associated with re-identification, i.e. handling of temporary occlusions of a tracked object and movements of a tracked object between different camera views of the scene.

Further utility of the inventive method may be especially pronounced when tracking objects in a scene comprising a source and a sink located adjacent to one another or being overlapping.

The sink and the source may (e.g. in a vehicle tracking application) be located along respective lanes of a road, at an exit and an entrance, respectively, of a parking space, or at an off-ramp and an on-ramp, respectively, along a road.

The sink and the source may also (e.g. in an application tracking individuals such as pedestrians and/or cyclists) be located at a portion, or at respective adjacent portions, of a walking path or pavement leading out from the scene, or at an exit and an entry, respectively, of a building, an indoor space (e.g. a room) or an outdoor space (e.g. a park).

By "re-identification threshold" is here meant a respective threshold associated with each respective tracked object for re-identifying, by the re-identification algorithm, an object detected in a frame of the video sequence as the respective tracked object. That is, for an object detected in a second frame to be re-identified as an object identified in a preceding first frame, the object features extracted from the second frame need to match the object features extracted from the first frame to a degree defined by the re-identification threshold.

By the term "object" (e.g. "the first object", "the second object", etc.) is here meant a depiction in the video sequence (more specifically in one or more frames of the video sequence) of a physical object in the scene (the physical object being of a type being tracked such as a vehicle or an individual). Correspondingly, the term "physical object" refers to the actual physical object moving about in the monitored scene. Accordingly, as may be understood from the preceding discussion, two "objects" in the video sequence (e.g. "the first object" and "the second object") may depending on the scenario depict a same physical object or different physical objects in the scene.

In some embodiments, the method further comprises, subsequent to adjusting the re-identification threshold associated with the first object:

detecting entry of the second object at the source;

re-identifying, by the re-identification algorithm using the adjusted re-identification threshold, the second object as the first object; and subsequently continuing tracking of the second object as the first object.

Thereby, a scenario wherein the second object is sufficiently similar to the currently tracked first object (as the case may be especially when the first and second objects actually correspond to the same physical object) may be resolved by re-identifying the second object as the first object such that tracking of the first object may be continued.

In some embodiments, the method further comprises, after re-identifying the second object as the first object, restoring the re-identification threshold, and continuing the tracking of the second object as the first object using the restored re-identification threshold. By "restoring" the re-identification threshold is here meant restoring or reverting the re-identification threshold to the value it had prior to being adjusted, e.g. a predetermined default re-identification threshold value. This approach is based on the notion that after having resolved the exit-and-re-entry scenario (i.e. re-identified the second object as the first object using the adjusted re-identification threshold), the tracking of the first object may proceed using the original value of the re-identification threshold.

In some embodiments, re-identifying the second object as the first object comprises comparing a set of second object features of the second object (i.e. features of the second object extracted from a video frame comprising the second object) to a set of first object features of the first object (i.e. features of the first object extracted from a video frame comprising the first object) to generate a matching score, and, comparing the matching score to the adjusted re-identification threshold. Generating a matching score between the first and second object features in this manner enables the re-identification to be evaluated using a threshold test.

The matching score may be defined such that the matching score increases the more similar the set of first object features and the set of second object features are (e.g., the matching score increases with decreasing distance between the set of first object features and the set of second object features). The re-identification threshold may in this case be adjusted by being raised. The second object may thus be re-identified as the first object in response to the matching score meeting or exceeding the adjusted (raised) re-identification threshold.

Alternatively, the matching score may be defined such that the matching score decreases the more similar the set of first object features and the set of second object features are (e.g., the matching score decreases with decreasing distance between the set of first object features and the set of second object features). The re-identification threshold may in this case be adjusted by being lowered. The second object may thus be re-identified as the first object in response to the matching score meeting or falling below the adjusted (lowered) re-identification threshold.

In some embodiments, tracking the first object comprises maintaining a tracking context for the first object, and wherein re-identifying the second object as the first object comprises associating the second object with the tracking context for the first object.

The "re-identification" of the second object as the first object may thus simply be realized by associating the second object with the already existing tracking context of the first object. The second object may thus in a sense inherit previously determined tracking data (e.g. the tracklet) for the first object.

In some embodiments, the entry of the second object at the source is detected within a predetermined time from detecting that the first object has exited the scene at the sink. That is, a further condition for re-identifying the second object as the first object may be that the second object enter the scene at the source within the predetermined time from the exit of the first object at the sink.

In some embodiments, the method further comprises, subsequent to determining that more than a predetermined time has elapsed since detecting that the first object has exited the scene at the sink:

detecting entry of the second object at the source; and tracking the second object as an object different from the first object using the re-identification algorithm and a re-identification threshold associated with the second object.

Hence, if it is determined that more than a predetermined time has elapsed since detecting that the first object has exited the scene at the sink, it may no longer be relevant to attempt to re-identify new objects entering the scene at the source as the first object. The method may in this case simply determine that the second object is to be tracked as a new object. In embodiments wherein tracking the first object comprises maintaining a tracking context for the first object, the method may further comprise, responsive to determining that more than the predetermined time has elapsed since detecting that the first object has exited the scene at the sink, removing the tracking context for the first object from a set of active tracking contexts maintained by the re-identification algorithm. Both computational and memory resources may thus be preserved by terminating tracking of the first object.

Furthermore, as discussed above, a scenario may occur wherein the second object is not sufficiently similar to the currently tracked first object to be re-identified as the first object. Accordingly, in some embodiments, the method may further comprise, subsequent to adjusting the re-identification threshold associated with the first object:

detecting entry of the second object at the source;

determining, using the re-identification algorithm and the adjusted re-identification threshold, that the second object is different from the first object; and subsequently tracking the second object as an object different from the first object using the re-identification algorithm and a re-identification threshold associated with the second object.

The second re-identification threshold may typically be set to the same value as the (non-adjusted) re-identification threshold associated with the first object, e.g. a predetermined default re-identification threshold value.

In some embodiments, the method comprises determining locations of a set of sources where objects enter the scene, wherein said source is one source among the set of sources, and wherein, subsequent to adjusting the re-identification threshold, a probability that the re-identification algorithm re-identifies an object entering the scene at any one of the set of sources as the first object is reduced.

That is, it is sufficient to adjust and maintain a single common re-identification threshold associated with the first object, which may be used by the re-identification algorithm regardless of at which source of a number of sources of the scene the second object enters the scene.

In some embodiments, the method further comprises, subsequent to adjusting the re-identification threshold associated with the first object:

detecting entry of the second object at any one of the set of sources;

re-identifying, by the re-identification algorithm using the adjusted re-identification threshold, the second object as the first object; and subsequently continuing tracking of the second object as the first object.

Thereby, a scenario wherein a second object which is sufficiently similar to the currently tracked first object, and enters the scene at any one of the set of sources, may be resolved by re-identifying the second object as the first object such that tracking of the first object may be continued.

In some embodiments, the sink is a first sink and the method further comprises determining a location of a second sink where objects exit the scene, and the method further comprises:

tracking a third object moving in the scene using the re-identification algorithm, wherein the third object is associated with a respective re-identification threshold of the re-identification algorithm;

detecting that the third object has exited the scene at the second sink; and responsive to detecting that the third object has exited the scene at the second sink, terminating tracking of the third object such that re-identification of a fourth object, entering the scene at the source, as the third object is prevented.

Hence, the method recognizes the fact that some scenes may comprise a sink ("second sink") such that, after an object ("third object") has exited the scene at the second sink, the likelihood that the third object re-enters the scene at a source is substantially zero. Computational resources may thus be preserved by terminating tracking of the third object.

In some embodiments, tracking the third object comprises maintaining a tracking context for the third object, and wherein terminating tracking of the third object comprises removing the tracking context for the third object from a set of active tracking contexts maintained by the re-identification algorithm. Memory resources for maintaining the tracking context for the third object may thus be released.

According to a second aspect of the present invention, there is provided a computer program product comprising computer program code portions configured to perform a method of tracking objects in a video sequence of a scene according to the method of the first aspects or any of embodiments thereof, when executed by a processing device.

According to a third aspect of the present invention, there is provided an object tracking system comprising:

at least one camera for capturing a video sequence of a scene; and a processing device configured to track objects in the video sequence according to the method of the first aspects or any of embodiments thereof.

The second and third aspects feature the same or equivalent benefits as the first aspect. Any functions described in relation to the first aspect, may have corresponding features in a system and vice versa.

BRIEF DESCRIPTION OF THE DRAWINGS

This and other aspects of the present invention will now be described in more detail, with reference to the appended drawings showing embodiments of the present invention.

FIG. 4 is a flow chart of an extension of the method of FIG. 3.

DETAILED DESCRIPTION

Figure 1:
FIG. 1 schematically shows a view of a scene.

FIG. 1 schematically shows an example view of a scene 1 monitored by a camera. The view may correspond to a video frame of a video sequence captured by the camera. At the point in time illustrated in FIG. 1, the scene 1 comprises a number of objects in the form of vehicles moving about in the scene 1, each being tracked by a re-identification algorithm.

The scene 1 comprises a number of sources 2a-c and a number or sinks 4a-c. It is to be noted that the respective number of sources and sinks in FIG. 1 merely is a non-limiting example and that a scene more generally may comprise any number of sources and sinks, however at least one source and at least one sink. Each source 2a-c represents a region of the scene 1 at or in which objects may enter the scene 1. Conversely, each sink 4a-c represents a region of the scene 1 at or in which objects may exit the scene 1. Thus, each source 2a-c represents a possible point of entry for an object into the scene 1, whereas each sink 4a-c represents a possible point of exit for an object from the scene 1.

In the illustrated example, each of the sources 2a-c and the sinks 4a-c are located along respective lanes of road segments leading into or out from the monitored view of the scene 1. A source and a sink may as shown be located adjacent each other, such as along respective road lanes, e.g. in FIG. 1 the source 2a and the sink 4a, the source 2b and the sink 4b, and the source 2c and the sink 4c.

At the time instant represented by FIG. 1, one of the tracked objects, e.g. the car 10a has just entered the scene 1 at the source 2c and is moving towards the sink 4a. Using re-identification the car 10a may be tracked across successive video frames as it moves through the scene 1. During the movement, the car 10a may be temporarily occluded, completely or partially, by another tracked object (e.g. another car) or by a fixed obstacle or structure (e.g. a tree canopy, a traffic light or a building). The use of re-identification here allows the car 10a to be re-identified as the same object prior to and after the occlusion event, such that the car 10a may be associated with the currently identified object and its track (e.g. the tracklet recording the previous coordinates of the object in the frames).

More specifically, a re-identification algorithm may be implemented by extracting from a number of successive video frames of the video sequence a set of object features of an object detected in the video frames. The extracted object features from a given video frame may be compared to object features extracted from one or more preceding video frames to generate a matching score. The re-identification algorithm may perform a threshold test comprising comparing the matching score to a re-identification threshold associated with the respective tracked object. Responsive to the matching score passing the threshold test, the object features extracted from the given frame and the one or more preceding frames may be determined to belong to a same (physical) object and the object in the given video frame may thus be re-identified as such. The location of the re-identified object in the given frame may accordingly be recorded in a tracklet associated with the object. In the event that the matching score does not pass the threshold test, the object features extracted from the object in the given video frame may be determined as an object different from the object identified in the preceding one or more video frames and its location in the given frame may hence not be associated with the previously tracked object.

A respective tracking context may be maintained for each object being tracked. The tracking context may comprise an object identifier and a tracklet defining the track travelled by the object. When a new object is detected and identified in the video sequence, a new tracking context may be created. When at some point tracking of an object is to be terminated, further attempts to re-identify detected objects with the currently tracked object may be stopped, and updating of the tracklet of the tracking context associated with the currently tracked object may be stopped.

The re-identification algorithm may maintain a set of active or current tracking contexts, each associated with a respective object currently tracked by the re-identification algorithm. Each time a new object is detected and identified in the video sequence by the re-identification algorithm, a new tracking context may be created and added to the set of active tracking contexts. Upon terminating tracking of a given object associated with a tracking context of the set of active tracking contexts, the associated tracking context may be removed from the set of active tracking contexts. Thereby, re-identification of a new object subsequently entering the scene at a source, as the given object may be prevented (i.e., since the tracking context associated with the given object has been removed from the set of active tracking contexts). The tracking may be terminated responsive to determining that the given object has exited the scene at a sink such that the likelihood that the object re-enters the scene at a source is substantially zero. The tracking may also be terminated responsive to determining that more than a predetermined time has expired from detecting that the object has exited the scene at a sink.

A video sequence of a scene such as the scene 1 is subject to dynamic conditions, such as changing lighting conditions, variable weather and visibility conditions etc. Therefore, each tracked object is associated with a re-identification threshold which may be set to provide some tolerance for a changing appearance of a tracked object. The respective re-identification threshold may be comprised or stored in the tracking context for the tracked object. For instance, the lighting conditions in the scene may change from sunny to cloudy over the course of a few video frames, resulting in an apparent change of color of a tracked object, such as the car 10a. As another example, an object may move into and out of an area illuminated by a street light. To be able to reliably track an object, such as the car 10a, during such changes the re-identification threshold may accordingly be set to a value such that the re-identification algorithm despite some change of apparent color of the car 10a still may re-identify the car 10a as being the same object.

The tolerance provided by the re-identification algorithm and the re-identification threshold may however create an issue upon a tracked object exiting the scene at a sink. For instance, consider the car 10b which in FIG. 1 is about to exit the scene 1 at the sink 4a. If, after the car 10b exiting the scene at the sink 4a, a different car of a similar make, model and/or color (i.e. similar within the tolerance defined by the re-identification threshold associated with the car 10b) enters the scene 1 at a source such as the adjacent source 2a, there is a risk that the re-identification algorithm re-identifies this new and different car as a same object as the car 10b, and hence continues tracking the new car as the currently tracked car 10b (e.g. recording the further detected locations of the new car in the tracklet of the tracking context for the currently tracked car 10b). On the other hand, in some instances, such as for the adjacent source 2a and sink 4a, it is possible that the car 10b after exiting the scene 1 at the sink 4a makes a U-turn and thus again enters the scene 1 at the source 2a. In this case, it would be desirable that the car 10b upon entering the scene 1 at the source 2a indeed is re-identified and continually tracked as the same object.

These seemingly competing goals may as set out in the present disclosure be addressed by, responsive to detecting that a first tracked object has exited the scene at a sink, adjusting the re-identification threshold associated with the first tracked object such that a probability that the re-identification algorithm re-identifies a second object, entering the scene at a source after the first tracked object has exited the scene at the sink, as the first object is reduced. In other words, the tolerance of the re-identification algorithm when attempting to re-identify the second object as the first tracked object may be reduced such that a greater visual similarity between the second object and the first object is needed for the re-identification algorithm to re-identify the second object as the first tracked object.

Example implementations of the method will in the following be discussed in further detail with reference to FIG. 1, and further with reference to FIG. 2-4.

While FIG. 1 shows an example of a vehicle tracking application, the location and type of sources and sinks will as may be appreciated vary depending on the type of scene and objects being tracked. For instance, in case of additionally or alternatively tracking pedestrians, a source 6a and a sink 8a for pedestrians may be located along a pavement or walking path, such as at a portion of the pavement or walking path thereof leading into or out from the scene. Source 6b and sink 8b illustrate an example of an overlapping source and sink. Accordingly, it is to be noted that the following disclosure is equally applicable also to other tracking applications and other configurations and combinations of sources and sinks.

Figure 2:
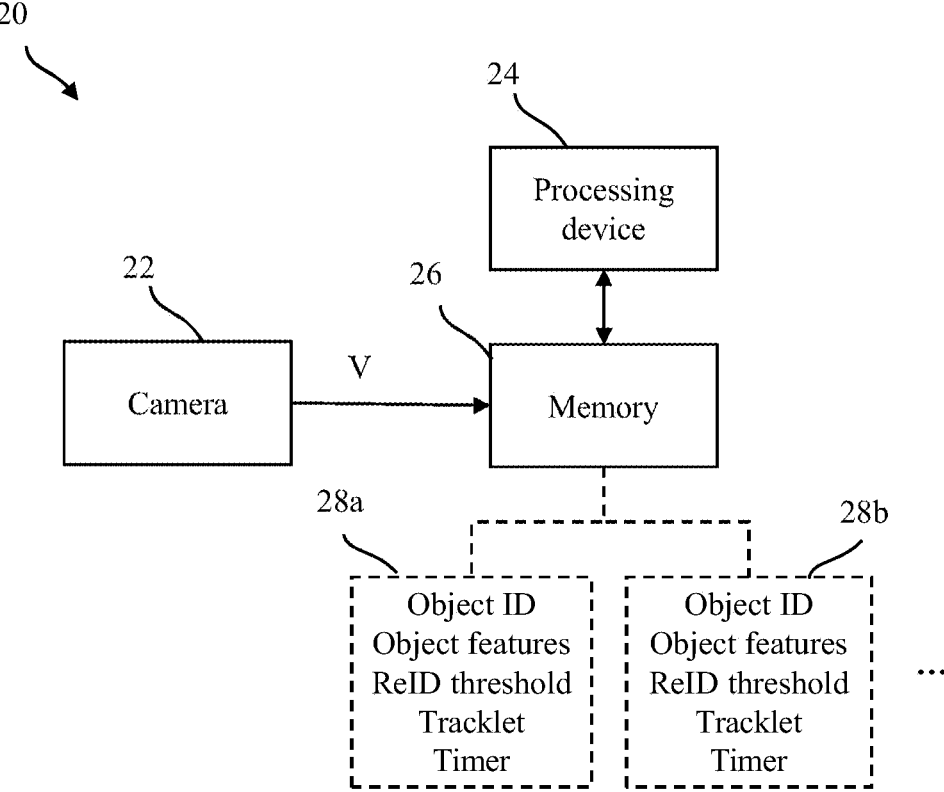
FIG. 2 shows an implementation of an object tracking system.

FIG. 2 shows an example implementation of an object tracking system 20. The system 20 comprises a video monitoring camera 22 for capturing a video sequence V of a scene, such as the scene 1. While FIG. 1 shows a single view-scene and FIG. 2 shows a single camera 22, the system 20 may also comprise a system of two or more cameras, each monitoring a respective sub-view of a scene.

The system 20 further comprises a processing device 24 and an associated memory 26. The memory 26 may be coupled to or comprised in the processing device 24. The processing device 24 is configured to receive the video sequence V in the form of a sequence of video frames from the camera 22. As indicated in FIG. 2, the video sequence V may be stored in the memory 26 wherein the processing device 24 may retrieve and process the video frames from the memory 26 to track objects in the video sequence across the sequence of video frames.

The processing device 24 may maintain a set of active tracking contexts in the memory 26, comprising a respective tracking context for each currently tracked object. FIG. 2 schematically indicates two tracking contexts 28a-b, however the number of tracking contexts 28a-b will depend on the number of currently tracked objects. A tracking context may as shown comprise a set of data fields, such as one or more of an object ID, a set of object features representing the object, a re-identification (ReID) threshold, and a tracklet. The tracking context may optionally further comprise a timer field, described in further detail below. The data fields of the tracking context may be updated by the processing device 24 over the course of the tracking, as will be further described in the following.

The object tracking method may be implemented in both hardware and software. In a software implementation, the processing device 24 may be realized in the form of one or more processors, such as one or more central processing units and/or graphical processing units, which in association with computer program code instructions stored on a (non-transitory) computer-readable medium, such as a non-volatile memory, causes the processing device 24 to carry out the steps of the object tracking method. Examples of non-volatile memory include read-only memory, flash memory, ferroelectric RAM, magnetic computer storage devices, optical discs, and the like. In a hardware implementation, the processing device 24 may instead be realized by dedicated circuitry configured to implement the steps of the object tracking method. The circuitry may be in the form of one or more integrated circuits, such as one or more application specific integrated circuits (ASICs) or one or more field-programmable gate arrays (FPGAs). It is to be understood that it is also possible to have a combination of a hardware and a software implementation, meaning that some method steps may be implemented in dedicated circuitry and others in software.

Figure 3:
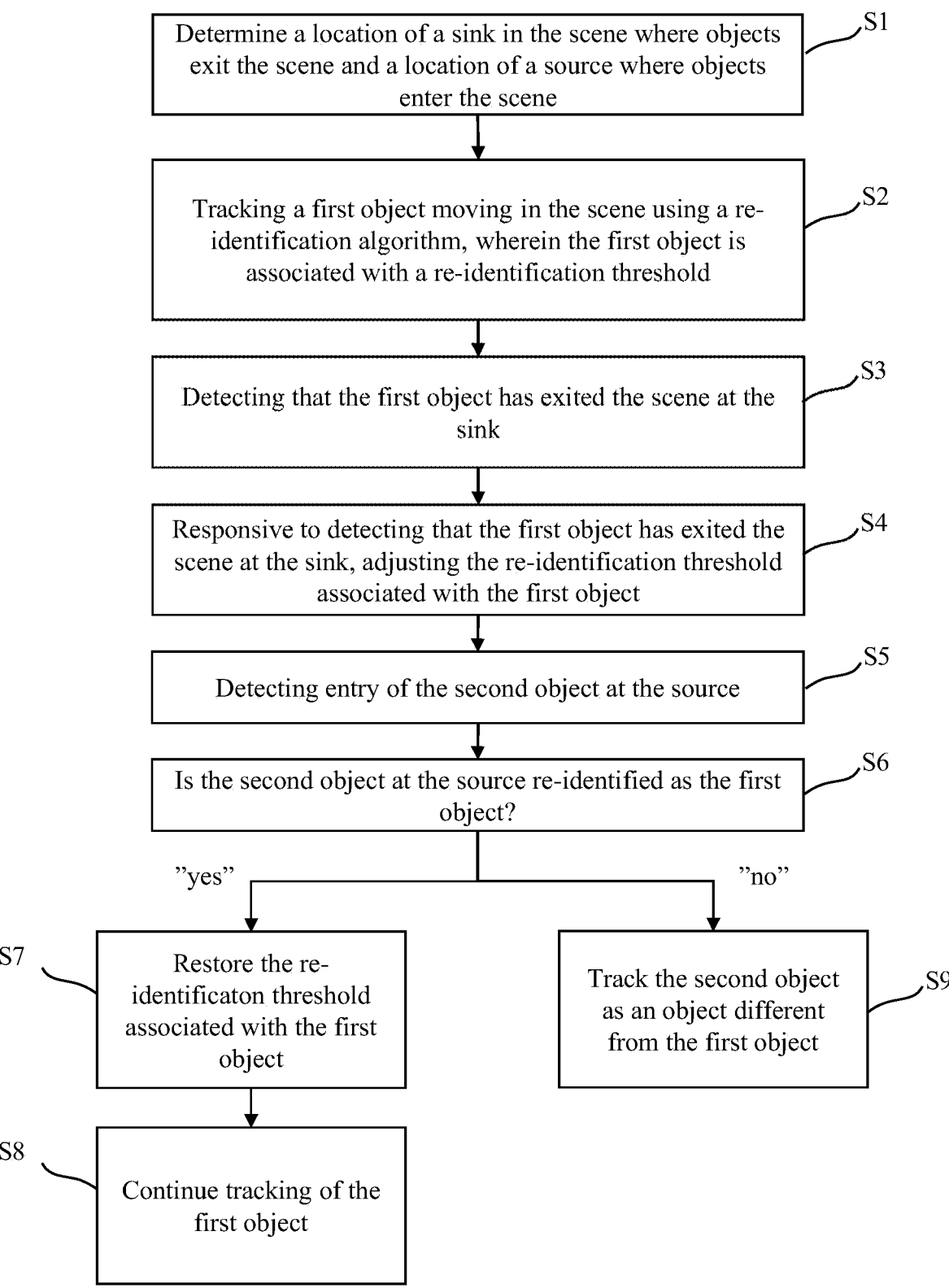
FIG. 3 is a flow chart of a method of tracking objects in a video sequence of a scene.

FIG. 3 shows a flow chart of an example implementation of the object tracking method.

At step S1, the processing device 24 determines a respective location of at least one sink (e.g. one or more of sinks 4a-c) in the scene 1 where objects may exit the scene 1 and a respective location of at least one source (e.g. one or more of sources 2a-c) where objects may enter the scene 1. The locations of sources 2a-c and sinks 4a-c may be determined by an operator manually indicating, e.g. via a graphical user input interface, where in the scene 1 the sources 2a-c and sinks 4a-c are located. However, the processing device 24 may also implement an automatic determination of the respective locations of one or more sources and sinks, e.g. using an image recognition algorithm. As a non-limiting example, the image recognition algorithm may be configured or trained to identify road lanes in the scene 1 and the points of entry and exit of the road lanes at the periphery of the scene 1.

At step S2, the processing device 24 tracks one or more objects detected in the scene 1 using a re-identification algorithm. For instance, when an object, such as the car 10a, enters the scene 1 at a source, such as the source 2c, the processing device 24 attempts to determine whether the detected object (e.g. the car 10a) corresponds to an object already being tracked. The processing device 24 accordingly extracts a set of object features from the video frame in which the object (e.g. the car 10a) is detected at the source 2c, and compares the set of object features to a respective set of object features associated with one or more currently tracked objects (e.g. each object for which a respective tracking context 28a-b is maintained by the processing device 24).

The processing device 24 may determine a distance (e.g. a Euclidian distance or another distance suitable comparing sets of object features, possibly multi-dimensional) between the set of object features of the newly detected object to the set of object features of a currently tracked object to generate a matching score. The extracted object features may generally include visual features as well as latent (hidden) features. Non-limiting examples of object features include feature vectors extracted by a convolutional neural network (CNN), color histograms, and computer vision feature descriptors like Histogram of Oriented Gradients (HOG) or Speeded-Up Robust Features (SURF). The processing device 24 may compare the matching score to the re-identification threshold associated with the currently tracked object (e.g. stored in the tracking context for the respective currently tracked object). The matching score may be defined to increase (e.g. monotonically, typically strictly monotonically) with increasing similarity (e.g. a decreasing distance) between the compared sets of object features, wherein the newly detected object may be re-identified as the currently tracked object responsive to the matching score meeting or exceeding the re-identification threshold. Alternatively, the matching score may be defined to decrease (e.g. monotonically, typically strictly monotonically) with increasing similarity (e.g. a decreasing distance) between the compared sets of object features, wherein the newly detected object may be re-identified as the currently tracked object responsive to the matching score meeting or falling below the re-identification threshold. In either case, upon passing the threshold test, the processing device 24 may proceed with tracking the object (e.g. the car 10a) in subsequent frames as the currently tracked object, e.g. recording the successive locations of the object in the tracklet of the respective tracking context (e.g. the tracking context 28a).

The car 10b is an example of an object (hereinafter interchangeably "first object") which at the time instant illustrated in FIG. 1 has been tracked by the processing device 24 using the re-identification algorithm across a sequence of preceding video frames. The processing device 24 may accordingly at the time instant illustrated in FIG. 1 maintain a tracking context 28b for the first object 10b in the memory 26 (i.e., the tracking context 28b is maintained in the set of active tracking contexts 28a-b). The first object 10b may for instance have entered the scene e.g. at the source 2b or the source 2c. The first object 10b is as shown in FIG. 1 about to exit the scene 1 at the sink 4a. Accordingly, at step S3, the processing device 24 detects that in a video frame successive to the frame illustrated in FIG. 1, the first object 10b has exited the scene at the sink 4a.

At step S4, the processing device 24, responsive to detecting that the first object 10b has exited the scene at the sink, adjusts the re-identification threshold associated with the first object 10b (e.g. the ReID threshold of the tracking context 28b). The re-identification threshold may prior to being adjusted be set to a default re-identification threshold value. If the matching score is defined to increase with increasing similarity the re-identification threshold may be raised by applying an additive offset to the default value of the re-identification threshold, or by scaling the default value of the re-identification threshold by a factor greater than one. If the matching score is defined to decrease with increasing similarity the re-identification threshold may be reduced by applying a subtractive (negative) offset to the default value of the re-identification threshold, or by scaling the default value of the re-identification threshold by a factor less than one.

The default value of the re-identification threshold, as well as the amount by which the re-identification threshold is adjusted, each represent design parameters whose values may be established based on a priori knowledge of the type of objects being tracked, the scene, the locations of sources and sinks, the tolerance needed to enable a reliable re-identification of tracked objects, and what risk to re-identify a similar but different object as an object which has left the scene at a sink is acceptable, etc. The matching score used by the re-identification algorithm may typically be determined as a normalized value. Accordingly, the matching score as well as the re-identification threshold may be within the range [0, 1]. If the matching score is defined to increase when the object features are more similar, a default value of the re-identification threshold may be in a range of 0.6-0.7, as a non-limiting example. If the matching score is defined to decrease when the object features are more similar, a default value of the re-identification threshold may be in a range of 0.3-0.4. In either case, the re-identification threshold may for instance be adjusted (increased or decreased) by 10-30%. In either case, the re-identification threshold is thus adjusted such that a probability that the re-identification algorithm re-identifies a second object, entering the scene at the source after the first object has exited the scene at the sink, as the first object is reduced.

Subsequent to adjusting the re-identification threshold associated with the first object 10b, the processing device 24, at S5, may detect entry of a second object into the scene 1 at a source. The second object may be detected at any one of the sources 2a-c of the scene, for instance at the source 2a adjacent the sink 4a.

Responsive to detecting the second object at the source, the processing device 24, at S6 attempts to re-identify, using the re-identification algorithm and the raised re-identification threshold, the second object as the first object 10b. As discussed above, the processing device 24 may compare a set of second object features of the second object to a set of first object features of the first object 10b to generate a matching score. The processing device 24 may perform a threshold test comprising comparing the matching score to the adjusted re-identification threshold. Responsive to the matching score passing the threshold test (e.g. in the case of a raised re-identification threshold, the matching score meeting or exceeding the raised re-identification threshold, or in the case of a lowered re-identification threshold, the matching score meeting or falling below the lowered re-identification threshold), the second object is re-identified as the first object 10b wherein the method proceeds along the "yes" branch in FIG. 3. Responsive to the matching score not passing the threshold test (e.g. in the case of a raised re-identification threshold, the matching score being less than the raised re-identification threshold, or in the case of a lowered re-identification threshold, the matching score exceeding the lowered re-identification threshold) the second object is determined to be different from the first object 10b wherein the method proceeds along the "no" branch in FIG. 3.

If the method proceeds to the "yes" branch, after having re-identified the second object as the first object 10b, the processing device 24, at step S7, restores the adjusted re-identification threshold to the value of the re-identification threshold prior to being adjusted, e.g. the default value. The re-identification threshold may be restored by subtracting the additive offset, adding the subtractive offset, or re-scaling the raised re-identification threshold by the inverse to the afore-mentioned scaling factor.

The processing device 24 may subsequently, at S8, continue the tracking of the second object as the first object 10b using the restored re-identification threshold.

If the method proceeds to the "no" branch, the processing device 24, at step S9, proceeds by tracking the second object as an object different from the first object 10b. Assuming the processing device 24 fails to re-identify the second object as any currently tracked object, the second object may be tracked as a new object, e.g. creating and adding a new tracking context associated with the second object to the set of active tracking contexts, as set out with reference to the entry of the object 10a at source 2c in FIG. 1.

Accordingly, the method as set out above may reduce a risk of inadvertently continuing tracking a second object, which likely corresponds to a different physical object than the tracked object 10b, as the tracked object 10b by adjusting the re-identification threshold, and thus require a greater visual similarity between the second object and the first object 10b for a successful re-identification. However, provided the second object and the first object 10b are sufficiently similar to generate a matching score passing the threshold test with the adjusted re-identification threshold (in which case the second object is more likely to correspond to the same physical object as the first object 10b), the second object may be still re-identified as the first object 10b and continually tracked accordingly.

To avoid attempting to re-identify objects entering the scene 1 at a source as the first object 10b indefinitely, a further condition for re-identifying a second object as the first object 10b may be applied, namely that the second object enters the scene 1 at the source within a predetermined time from the exit of the first object 10b at the sink. If this additional condition is met, the method may proceed according to the "yes" branch. If this additional condition is not met, the method may proceed according to the "no" branch. The processing device 24 may for example maintain a timer for each tracking context 28a-b (the "Timer" field in FIG. 2). Responsive to detecting that the first object 10b has exited the scene 1 at the sink 4a, the processing device 24 may start incrementing a value of the timer. Provided no second object entering the scene has been re-identified as the first object 10b when the timer has reached a predetermined time limit, the tracking of the first object 10b may be terminated, wherein the tracking context 28b for the first object 10b may be removed from the set of active tracking contexts. In case the first object 10b later re-enters the scene 1, it may thus be detected, identified and tracked as a new object, e.g. using a new tracking context. The value of the predetermined time may be based on scene knowledge. For instance, the predetermined time may be set depending on the type of tracking application, the particular types and locations of the sources and sinks in the scene, etc. The predetermined time may also be set in view of a number of tracking contexts that may be maintained by the available computational resources of the object tracking system 20.

FIG. 4 is a flow chart of an optional extension of the method in FIG. 3, which may be performed in parallel to the method steps in FIG. 3.

As discussed above, a scene may comprise a pair of source and sinks for which the likelihood for an object having exited the scene at the sink to shortly thereafter re-enter the scene at the source is substantially zero, or at least too small to motivate attempting a re-identification. The method of FIG. 4 allows this scenario to be addressed.

At S10, the processing device 24 determines a location of a second sink where objects exit the scene. With reference to FIG. 1, and in relation to the source 2a, the second sink may for instance be represented by the sink 4b.

The processing device 24, at S11, tracks a "third object" moving in the scene 1 using the re-identification algorithm and a respective re-identification threshold associated with the third object. With reference to FIG. 1, the third object may for instance be represented by the car or lorry 10c. The third object 10c is as shown in FIG. 1 about to exit the scene 1 at the second sink 4b. Accordingly, at step S12, the processing device 24 detects that in a video frame successive to the frame illustrated in FIG. 1, the third object 10c has exited the scene at the second sink 4c.

Responsive to detecting that the third object 10c has exited the scene 1 at the second sink 4b, the processing device 24 at S13 terminates tracking of the third object 10c such that re-identification of a fourth object, which may enter the scene 1 at any one of the sources 2a-c, as the third object is prevented. As previously discussed, terminating the tracking may comprise removing a tracking context associated with the third object, from a set of active tracking contexts maintained by the re-identification algorithm.

The location of the sink 4b may as discussed above be determined manually by an operator or automatically using an image recognition algorithm. The decision to determine the sink 4b as a "second sink" at which tracking is terminated may be based on scene knowledge. For instance, in the example scene 1 knowledge that a U-turn is forbidden or even impossible along the road segment following the sink 4b may be taken into account.

The person skilled in the art realizes that the present invention by no means is limited to the embodiments described above. On the contrary, many modifications and variations are possible within the scope of the appended claims.

The invention claimed is:

1. A computer-implemented method of tracking objects in a video sequence of a scene, the method comprising:

determining a location of a sink in the scene where objects exit the scene and a location of a source where objects enter the scene;

tracking a first object moving in the scene using a re-identification algorithm, wherein the first object is associated with a re-identification threshold of the re-identification algorithm;

detecting that the first object has exited the scene at the sink; and responsive to detecting that the first object has exited the scene at the sink, adjusting the re-identification threshold associated with the first object such that a probability that the re-identification algorithm re-identifies a second object, entering the scene at the source after the first object has exited the scene at the sink, as the first object is reduced;

the method further comprising, subsequent to adjusting the re-identification threshold associated with the first object:

detecting entry of the second object at the source; and responsive to detecting entry of the second object at the source, attempting to re-identify, using the re-identification algorithm and the adjusted re-identification threshold, the second object as the first object, wherein attempting to re-identify the second object as the first object comprises comparing a set of second object features of the second object to a set of first object features of the first object to generate a matching score, and, performing a threshold test by comparing the matching score to the adjusted re-identification threshold;

responsive to the matching score passing the threshold test:

re-identifying the second object as the first object, and thereafter restoring the re-identification threshold, and continuing the tracking of the second object as the first object (10b) using the restored re-identification threshold, responsive to the matching score not passing the threshold test:

determining that the second object is different from the first object, and subsequently tracking the second object as an object different from the first object using the re-identification algorithm and a re-identification threshold associated with the second object, wherein the matching score is defined such that the matching score increases the more similar the set of first object features and the set of second object features are, and wherein the re-identification threshold is adjusted by raising the re-identification threshold, or wherein the matching score is defined such that the matching score decreases the more similar the set of first object features and the set of second object features are, and wherein the re-identification threshold is adjusted by lowering the re-identification threshold.

2. The method according to claim 1, wherein tracking the first object comprises maintaining a tracking context for the first object, and wherein re-identifying the second object as the first object comprises associating the second object with the tracking context for the first object.

3. The method according to claim 1, wherein the entry of the second object at the source is detected within a predetermined time from detecting that the first object has exited the scene at the sink.

4. The method according to claim 1, wherein the method comprises determining locations of a set of sources where objects enter the scene, wherein said source is one source among the set of sources, and wherein, subsequent to adjusting the re-identification threshold, a probability that the re-identification algorithm re-identifies an object entering the scene at any one of the set of sources as the first object is reduced.

5. The method according to claim 4, wherein entry of the second object is detected at any one of the set of sources.

6. The method according to claim 1, wherein the sink is a first sink and the method further comprises determining a location of a second sink where objects exit the scene, and the method further comprises:

tracking a third object moving in the scene using the re-identification algorithm, wherein the third object is associated with a respective re-identification threshold of the re-identification algorithm;

detecting that the third object has exited the scene at the second sink; and responsive to detecting that the third object has exited the scene at the second sink, terminating tracking of the third object such that re-identification of a fourth object, entering the scene at the source, as the third object is prevented.

7. The method according to claim 6, wherein tracking the third object comprises maintaining a tracking context for the third object, and wherein terminating tracking of the third object comprises removing the tracking context for the third object from a set of active tracking contexts maintained by the re-identification algorithm.

8. The method according to claim 1, wherein the source and the sink are adjacent to one another or overlapping.

9. An object tracking system comprising:

at least one camera for capturing a video sequence of a scene; and a processing device configured to track objects in the video sequence according to a method comprising:

determining a location of a sink in the scene where objects exit the scene and a location of a source where objects enter the scene;

tracking a first object moving in the scene using a re-identification algorithm, wherein the first object is associated with a re-identification threshold of the re-identification algorithm;

detecting that the first object has exited the scene at the sink; and responsive to detecting that the first object has exited the scene at the sink, adjusting the re-identification threshold associated with the first object such that a probability that the re-identification algorithm re-identifies a second object, entering the scene at the source after the first object has exited the scene at the sink, as the first object is reduced;

the method further comprising, subsequent to adjusting the re-identification threshold associated with the first object:

detecting entry of the second object at the source; and responsive to detecting entry of the second object at the source, attempting to re-identify, using the re-identification algorithm and the adjusted re-identification threshold, the second object as the first object, wherein attempting to re-identify the second object as the first object comprises comparing a set of second object features of the second object to a set of first object features of the first object to generate a matching score, and, performing a threshold test by comparing the matching score to the adjusted re-identification threshold;

responsive to the matching score passing the threshold test:

re-identifying the second object as the first object, and thereafter restoring the re-identification threshold, and continuing the tracking of the second object as the first object (10*b*) using the restored re-identification threshold, responsive to the matching score not passing the threshold test:

determining that the second object is different from the first object, and subsequently tracking the second object as an object different from the first object using the re-identification algorithm and a re-identification threshold associated with the second object, wherein the matching score is defined such that the matching score increases the more similar the set of first object features and the set of second object features are, and wherein the re-identification threshold is adjusted by raising the re-identification threshold, or wherein the matching score is defined such that the matching score decreases the more similar the set of first object features and the set of second object features are, and wherein the re-identification threshold is adjusted by lowering the re-identification threshold.

10. A computer program product comprising computer program code portions configured to perform a method of tracking objects in a video sequence of a scene according to a method, when executed by a processing device, the method comprising:

determining a location of a sink in the scene where objects exit the scene and a location of a source where objects enter the scene;

tracking a first object moving in the scene using a re-identification algorithm, wherein the first object is associated with a re-identification threshold of the re-identification algorithm;

detecting that the first object has exited the scene at the sink; and responsive to detecting that the first object has exited the scene at the sink, adjusting the re-identification threshold associated with the first object such that a probability that the re-identification algorithm re-identifies a second object, entering the scene at the source after the first object has exited the scene at the sink, as the first object is reduced;

the method further comprising, subsequent to adjusting the re-identification threshold associated with the first object:

detecting entry of the second object at the source; and responsive to detecting entry of the second object at the source, attempting to re-identify, using the re-identification algorithm and the adjusted re-identification threshold, the second object as the first object, wherein attempting to re-identify the second object as the first object comprises comparing a set of second object features of the second object to a set of first object features of the first object to generate a matching score, and, performing a threshold test by comparing the matching score to the adjusted re-identification threshold;

responsive to the matching score passing the threshold test:

re-identifying the second object as the first object, and thereafter restoring the re-identification threshold, and continuing the tracking of the second object as the first object (10*b*) using the restored re-identification threshold, responsive to the matching score not passing the threshold test:

determining that the second object is different from the first object, and subsequently tracking the second object as an object different from the first object using the re-identification algorithm and a re-identification threshold associated with the second object, wherein the matching score is defined such that the matching score increases the more similar the set of first object features and the set of second object features are, and wherein the re-identification threshold is adjusted by raising the re-identification threshold, or wherein the matching score is defined such that the matching score decreases the more similar the set of first object features and the set of second object features are, and wherein the re-identification threshold is adjusted by lowering the re-identification threshold.

11. The method according to claim 1, wherein tracking the first object comprises maintaining a tracking context for the first object, and the method further comprises:

responsive to determining that more than a predetermined time has elapsed since detecting that the first object has exited the scene at the sink, removing the tracking context for the first object from a set of active tracking contexts maintained by the re-identification algorithm.

* * * * *